(12) United States Patent
Mueller

(10) Patent No.: US 11,946,564 B2
(45) Date of Patent: Apr. 2, 2024

(54) ROTARY VALVE FOR USE WITH A FLUID PROPORTIONER

(71) Applicant: Thomas D. Mueller, Cherry Hills Village, CO (US)

(72) Inventor: Thomas D. Mueller, Cherry Hills Village, CO (US)

( * ) Notice: Subject to any disclaimer, the term of this patent is extended or adjusted under 35 U.S.C. 154(b) by 0 days.

(21) Appl. No.: 17/818,842

(22) Filed: Aug. 10, 2022

(65) Prior Publication Data

US 2024/0052946 A1    Feb. 15, 2024

(51) Int. Cl.
*F16K 11/07* (2006.01)
*F16K 11/076* (2006.01)
*F16K 31/524* (2006.01)

(52) U.S. Cl.
CPC ...... *F16K 31/52483* (2013.01); *F16K 11/076* (2013.01)

(58) Field of Classification Search
CPC .................................. F16K 31/52483
See application file for complete search history.

(56) References Cited

U.S. PATENT DOCUMENTS

| | | | |
|---|---|---|---|
| 892,531 A | 7/1908 | Lewis | |
| 897,433 A | 9/1908 | Wagner et al. | |
| 2,635,585 A | 4/1953 | Damgaard | |
| 2,641,271 A * | 6/1953 | Pressler | B67D 7/742 |
| | | | 235/94 R |
| 2,755,740 A * | 7/1956 | McKean | F04C 14/223 |
| | | | 417/301 |
| 3,213,796 A | 10/1965 | Cordis | |
| 3,213,873 A | 10/1965 | Cordis | |
| 3,260,212 A * | 7/1966 | Johnson | F04B 13/00 |
| | | | 417/399 |
| 3,338,173 A * | 8/1967 | Gunzel, Jr. | B01F 25/31242 |
| | | | 417/186 |
| 3,672,389 A | 6/1972 | McConnell et al. | |
| 4,004,602 A | 1/1977 | Cordis et al. | |
| 4,392,508 A | 7/1983 | Switall | |
| 4,572,229 A | 2/1986 | Mueller et al. | |
| 4,830,583 A | 5/1989 | Edson | |
| 5,137,435 A | 8/1992 | Walton | |
| 5,433,240 A | 7/1995 | Mueller | |
| 5,484,270 A | 1/1996 | Adahan | |

(Continued)

FOREIGN PATENT DOCUMENTS

EP    1548283 A2    6/2005

*Primary Examiner* — Kevin R Barss
(74) *Attorney, Agent, or Firm* — Greer, Burns & Crain, Ltd.

(57) ABSTRACT

A rotary valve rotated by an arm connected to a piston being driven by the pressurized fluid, either water or air. The orientation of the valve body in the valve housing will direct the fluid in one of two directions to move the piston. The arm of the rotary valve is connected to a cam that rotates a shaft connected to the valve body. Two cam rollers are biased towards the outer surface of the rotating cam member. The cam rollers provide a force to the cam to aid in the changing of the orientation of the valve body. There are two bump outs on the cam that correlate to the end of the piston movement so that the rotary valve does not stop at an end point of the piston stroke. The rotary valve may be is utilized in a chemical dosing or chemical application device that is driven by pressurized fluid.

20 Claims, 5 Drawing Sheets

(56) References Cited

U.S. PATENT DOCUMENTS

| | | |
|---|---|---|
| 6,485,272 B2 | 11/2002 | Mueller |
| 7,438,537 B2 | 10/2008 | Walton |
| 10,968,901 B2 | 4/2021 | Furet et al. |
| 2002/0098096 A1* | 7/2002 | Mueller ................. F04B 13/00 417/403 |
| 2017/0260064 A1* | 9/2017 | Mueller ............. F16K 11/0712 |

* cited by examiner

ROTARY VALVE FOR USE WITH A FLUID PROPORTIONER

FIELD OF THE INVENTION

The present invention relates to a rotatory valve that may be used with a fluid proportioner.

BACKGROUND OF THE INVENTION

The present invention generally relates to mixing fluids. More specifically, the invention relates to the continuous mixing of two fluids in a consistent proportion into an exit stream.

The proportional mixing of fluids by automatic, self-powered devices is known. Such a device can be used to mix a fluid stream, such as water or air, with another fluid such as drugs, vaccines, nutrients, treating agents or the like. Traditional self-powered proportioners have a fluid motor and slave pump.

In a traditional self-powered device, the pressure of a first fluid stream, such as water, is used to power the device. The first fluid stream moves a piston within a cylinder, automatically metering an amount of the first fluid with each stroke by filling the cylinder with fluid. A gate alternates the fluid intake from one side of the piston to the other. Intake fluid pressure causes the motor piston to move, while fluid on the opposite side of the piston is simultaneously expelled. In one full stroke of the cylinder, two displacements of the first fluid are expelled from the cylinder into the exit stream.

In known devices, the piston also powers a proportioner. The proportioner may include a second pump has a second piston and second cylinder. The second piston has one working side, compared to the main piston which has two. The second pump draws in an amount of a second fluid through an intake, then expels it through an outlet into the exit stream. The expelled second fluid mixes with the first fluid expelled from the main piston. In one stroke, one displacement of fluid from the second cylinder is expelled into the exit stream. Thus, constant proportions of the two fluids are mixed in each stroke of the main piston.

Conventional devices often use a rotary valve as the gate. However, instead of completely rotating around an axis, the rotary valve rotates some distance less than a full rotation, stops and changes directions, and then rotates back in the opposite direction. In other words, the rotary valve does not continuously make full rotations. Such a movement is often controlled with a toggle switch or a biased connection. When the rotary valve reaches the end of the rotation, the toggle switch or biased connection provides a force to switch the direction of rotation.

While presumably effective for their intended purposes, this type of movement and structure creates a noticeable noise as the toggle switch or biased connection moves back and forth to constantly change the direction of the rotary valve. Although the noise is potentially unacceptable in many environments, it is symptomatic of an inherent volumetric design limitation. As the required volume of the driving fluid increases, the size of porting, valve, and toggle or biased connection and stop increases proportionally.

The increased inertial mass of the toggle switch or biased connection results in greater shock transmission to the internal and external components resulting in higher maintenance and replacement of the stops, internal bearings and other parts required to control movement. The ever-increasing size, strength, and pull of the toggle switching spring disrupts the vertical valve orientation and further accelerates internal bearing damage.

Therefore, it would be desirable to provide a device that addresses one or more of these concerns.

SUMMARY OF THE INVENTION

A new rotary valve has been invented which may be utilized in a chemical dosing device that is driven by pressurized water, such as the one disclosed in U.S. Pat. No. 6,485,272. The rotary valve is rotated by an arm connected to a piston being driven by the pressurized water. The orientation of the valve body (in the valve housing) will direct the water in one of two directions to move the piston. The arm of the rotary valve is connected to a cam that rotates a shaft connected to the valve body. Cam rollers are biased towards the outer surface of the rotating cam member to provide a force to the cam to aid in the changing of the orientation of the valve body. Bump outs or detents on the cam correlate to the end of the piston movement so that the rotary valve does not stop at an end point of the piston stroke.

Unlike conventional rotary valves, the present rotary valve completely rotates about its axis and makes continuous rotations. Thus, there is no need for a toggle switch or other device to force the rotary valve to change directions. Compared with conventional designs, the destructive shock transmission and noise are significantly reduced or eliminated by the present rotary valve, and there are fewer parts that are more easily suspectable to wear.

Accordingly, in an aspect of the present invention, the present invention may be generally characterized as providing a rotary valve for use with a fluid proportioner, the rotary valve having: a valve housing with an inlet and an outlet; a valve body rotatably mounted with the valve housing; a piston configured to move linearly within a cylinder; and, an arm configured to transfer a linear movement of the piston to a rotational movement of the valve body and rotate the valve body 360 degrees within the valve housing.

In another aspect, the present invention may be characterized, broadly, as providing a rotary valve for use with a fluid proportioner, the rotary valve having: a valve housing with an inlet and an outlet; a valve body rotatably mounted with the valve housing; a piston configured to move linearly within a cylinder; a cam disposed outside of the valve housing, the cam secured to the valve body so as to provide rotational movement to the valve body; and, an arm secured to the piston and to the cam and configured to transfer linear movement of the piston to the rotational movement of the valve body such that the valve body completely rotates within the valve housing.

These and other aspects and embodiments of the present invention, which may be combinable in any conceivable combination, will be appreciated by those of ordinary skill in the art based upon the following description of the drawings and detailed description of the preferred embodiments.

BRIEF DESCRIPTION OF THE DRAWINGS

The attached drawings will make it possible to understand how the invention can be produced and practiced, in which.

DETAILED DESCRIPTION

As mentioned above, a new rotary valve has been invented which provides a valve that rotates completely to change a flow of fluid driving the rotary valve.

Accordingly, with reference the attached drawings, one or more embodiments of the present invention will now be described with the understanding that the described embodiments are merely preferred and are not intended to be limiting.

Figure 1:
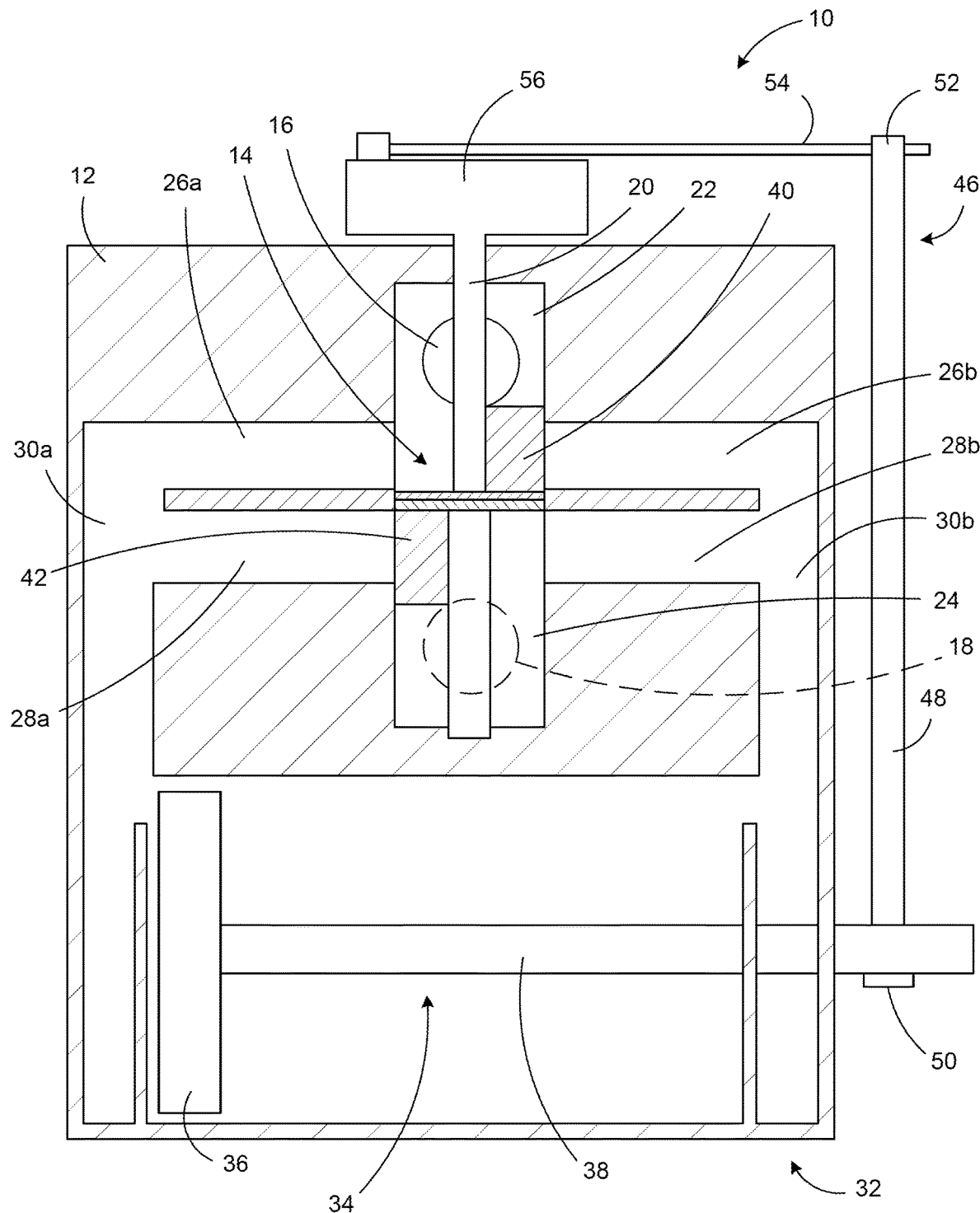
FIG. 1 is a side cutaway view of a rotary valve according to the present invention with a valve body in a first orientation.
Figure 2:
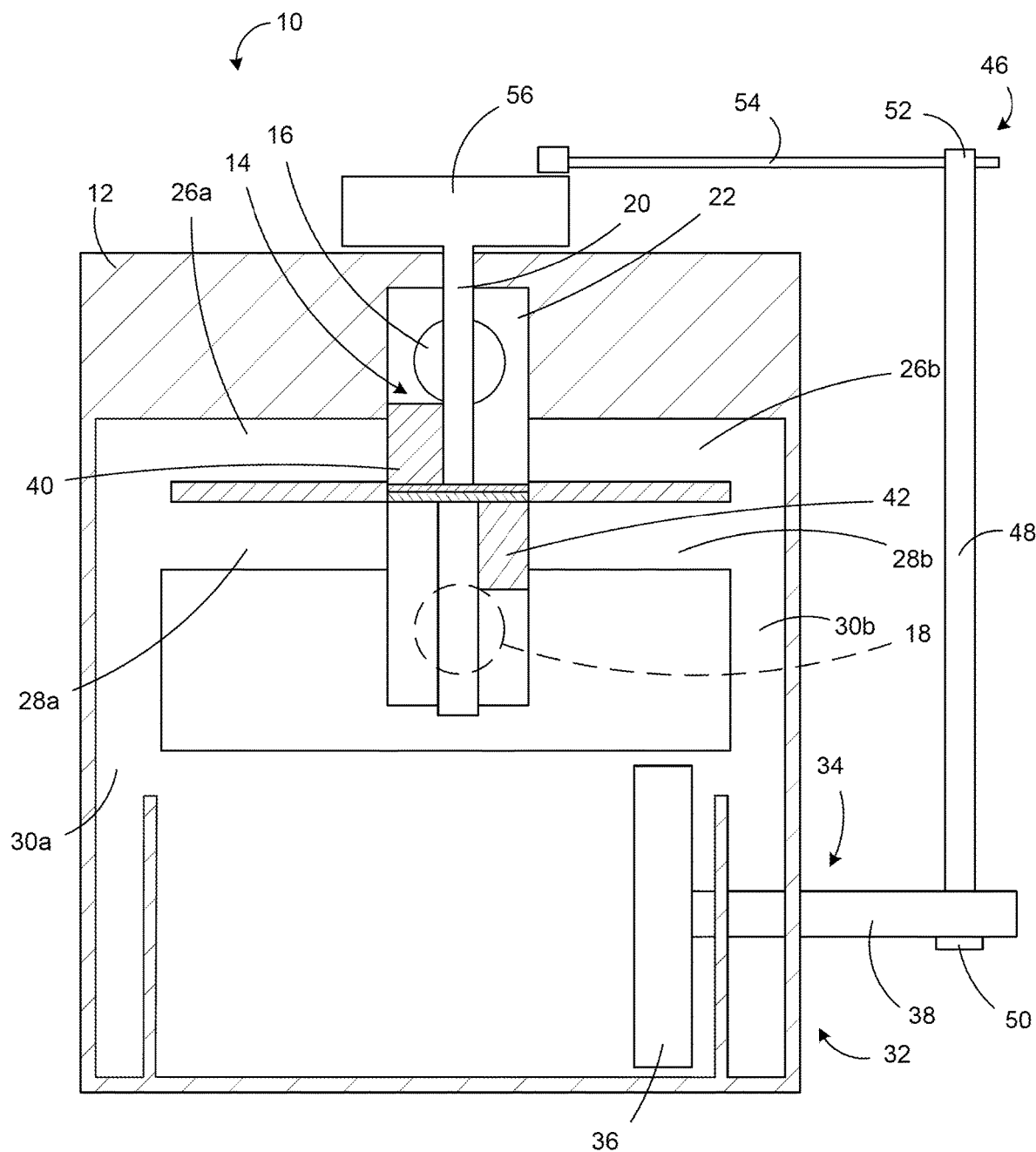
FIG. 2 is a side cutaway view of the rotary valve shown in FIG. 1 in which the valve body is in a second orientation.

With reference to FIGS. 1 and 2, a rotary valve 10 according to the present invention will be described. Although described as being for use with a fluid proportioner, it will be appreciated that the rotary valve 10 can be used in other devices.

The rotary valve 10 includes a valve housing 12 with a valve body 14 disposed inside of the valve housing 12. The valve housing 12 includes an inlet 16 for a fluid, like water or air, that will be used to drive the device associated with the rotary valve 10. Preferably located on an opposite side of the valve housing 12 is an outlet 18 for the expelled fluid. The valve body 14 includes a shaft 20 that allows the valve body 14 to rotate and change the orientation of the valve body 14.

Within the valve housing 12, there is an upper chamber 22 that is in communication with the inlet 16 and configured to receive the fluid. A lower chamber 24 of in the valve housing 12 is in communication with the outlet 18 and provides the fluid to the outlet 18. The lower chamber 24 is fluidically isolated (within the valve housing 12) from the upper chamber 22. A pair of upper flow channels 26a, 26b are located on opposite sides of the valve housing 12 and are each in selective communication with the upper chamber 22. A pair of lower flow channels 28a, 28b are also located on opposite sides of the valve housing 12 and are each in selective communication with the lower chamber 24. The pairs of upper and lower flow channels 26a/28a, 26b/28b on each side on fluidically connected to a vertical flow channel 30a, 30b.

Each vertical flow channel 30a, 30b is in communication with one side of a cylinder 32 which contains a piston 34 that is configured to move in a linear direction (along its axis) within the cylinder 32. The cylinder 32 can be integrally formed in with valve housing 12 or it may be attached thereto. The piston 34 includes a piston head 36 and a piston shaft 38 that extends from the piston head 36 out of the cylinder 32.

Within the valve housing 12, there are multiple paths for the fluid as it moves from the inlet 16 to the outlet 18. The orientation of the valve body 14 will direct the fluid to one of the paths.

In particular, the valve body 14 includes an upper seal 40 and a lower seal 42 that overlap the valve block portion with a minimum valve to housing clearance in combination with maximum component concentricity. It is believed that a minimum overlap of ⅛ of an inch, for each side, of the upper seal 40 and lower seal 42 is required so that the seals 40, 42 are at least ¼ of an inch wider than the flow channels 26a, 26b, 28a, 28b.

The upper seal 40 is configured to block fluid from entering one of the upper flow channels 26a, 26b from the upper chamber 22, while allowing fluid to flow from the upper chamber 22 into the other one of the upper flow channels 26a, 26b. The lower seal 42 is configured to block fluid from entering the lower chamber 24 from one of the lower flow channels 28a, 28b, while allowing fluid to flow from the other one of the lower flow channels 28a, 28b into the lower chamber 24. The upper and lower seals 40, 42 are arranged to be on opposite sides of the valve body 14 so that, for example, when the left (as shown in the FIGURES) upper flow channel 26a is open, the right lower flow channel 28b is open. The rotation of the shaft 20 of the valve body 14 will change the orientation of the valve body 14.

For example, starting in FIG. 1, as fluid enters the upper chamber 22 it flows to the left upper flow channel 26a. Upper seal 40 blocks the fluid from entering the right upper flow channel 26b. From the left upper flow channel 26a, the fluid flows into the left vertical channel 30a, and downward into the cylinder 32. The lower seal 42 blocks fluid from flowing out of the left lower flow channel 28a into the lower chamber 24.

Within the cylinder 32, the fluid pushes against the piston head 36 and forces the piston 34 to move to the right. Fluid on the right of the piston head 36 (from a previous stroke, for example), is forced out of the cylinder 32 as the piston head 36 moves to the right. The fluid exiting the cylinder 32 flows into the right vertical flow channel 30b. The upper seal 40 blocks fluid from flowing out of the right upper flow channel 26b into the upper chamber 22. Accordingly, the fluid flows through the right lower flow channel 28b, into the lower chamber 24, and out of the rotary valve via the outlet 18.

Eventually, the piston 34 will reach the end of its stroke, and orientation of the valve body 14 changes to reverse the flow (as shown in FIG. 2) so that the fluid moves the piston head 36 to the left. In order to change the orientation of the valve body 14, an arm 46 is provided.

The arm 46 includes a lower portion 48 that includes a first end 50 attached to the piston shaft 38. A second end 52 of the lower portion 48 is attached to a second portion 54 of the arm 46. The second portion 54 of the arm 46 is secured to a cam 56. The cam 56 is attached to the shaft 20 of the valve body 14 so that as the cam 56 rotates, the valve body 14 rotates. In this manner, the arm 46 converts the linear movement of the piston 34 to a rotational movement of the valve body 14 within the valve housing 12 while changing orientations. Accordingly, the linear movement of the piston 34 will rotate the valve body 14 between the orientations shown in FIGS. 1 and 2 without reversing direction and allowing the valve body 14 to continuously rotate completely (i.e., 360 degrees) about its rotational axis (e.g., the shaft 20).

Figure 3:
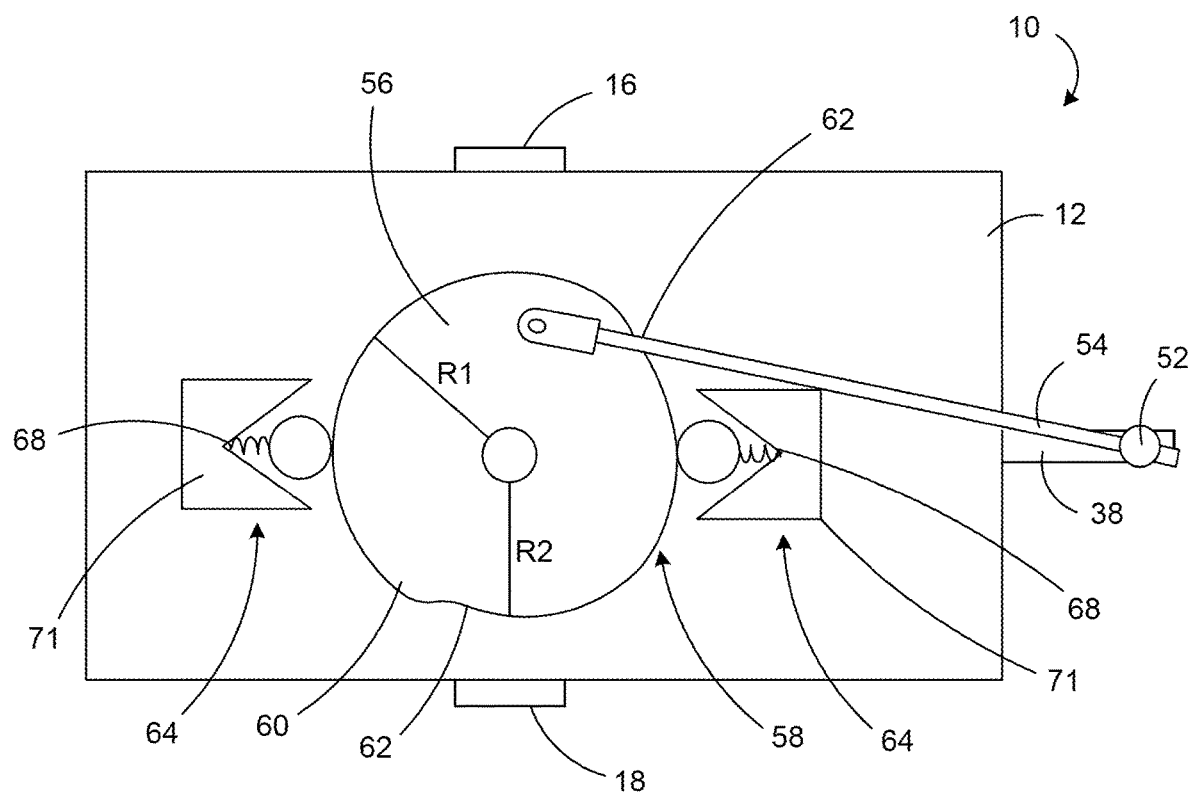
FIG. 3 is a top view of a rotary valve according to the present invention.

As shown in FIG. 3, in order to minimize the chances that the valve body 14 stops in a position that is in between the two orientations shown in FIGS. 1 and 2, the cam 56 includes a cam surface 58 formed by an outer surface 60 of the cam 56. The cam surface 58 includes one or more detents 62, or indentations. These detents 62 are changes in the outer shape of the cam 56. Accordingly, when viewed from a top (such as shown in FIG. 3), the outer shape of the cam 56 is not a perfect circle. Rather, the cam 56 has two different radii $R_1$, $R_2$ which are connected by transition sections that correspond to the detents 62.

Figure 4:
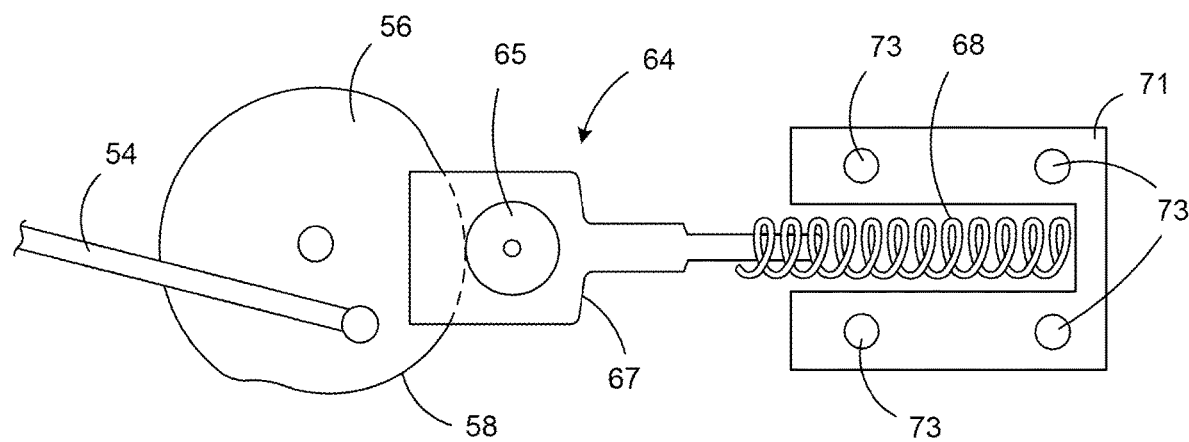
FIG. 4 is a top view of a cam and a cam follower according to one or more aspects of the present invention.

At least one cam follower 64 is provided and configured to engage the cam surface 58. As shown in FIG. 4, the cam follower 64 may include a roller 65 or a bearing within a housing 67. The roller 65 moves along the cam surface 58. The housing 67 may be slotted so that the cam is received within the housing 67. At least two cam followers 64 are preferably provided, with the two 64 being located on opposite sides of the cam 56.

Each cam follower 64 is biased towards the cam 56 by, for example, a spring 68. The strength of the spring 68 is directly related to the energy needed to ensure that the valve body 14 does not stop moving when the piston 34 changes directions. In particular, the positioning of the detents 62 is based on the displacement of the piston 34 in its stroke, so that when the piston 34 reaches the end of the stroke, at least one cam follower 64 engages at least one detent 62. If fluid is still being provided to the rotary valve 10, the force of the fluid is sufficient to overcome the spring 68, and the cam 56, and thus the valve body 14, will continue to rotate. If however, fluid has stopped, the spring 68 will either, depending if the transition is from R1 to R2 or from R2 to R1, force the cam 56 to continue to rotate or stop the rotation. The cam follower 64 thus help ensure that the valve body continues to rotates or stops rotating when the flow of fluid is ceasing to ensure that it is not stuck in between the two orientations. One or more brackets 71 may be secured to the valve 10 with fasteners 73 to hold the spring 68.

Figure 5:
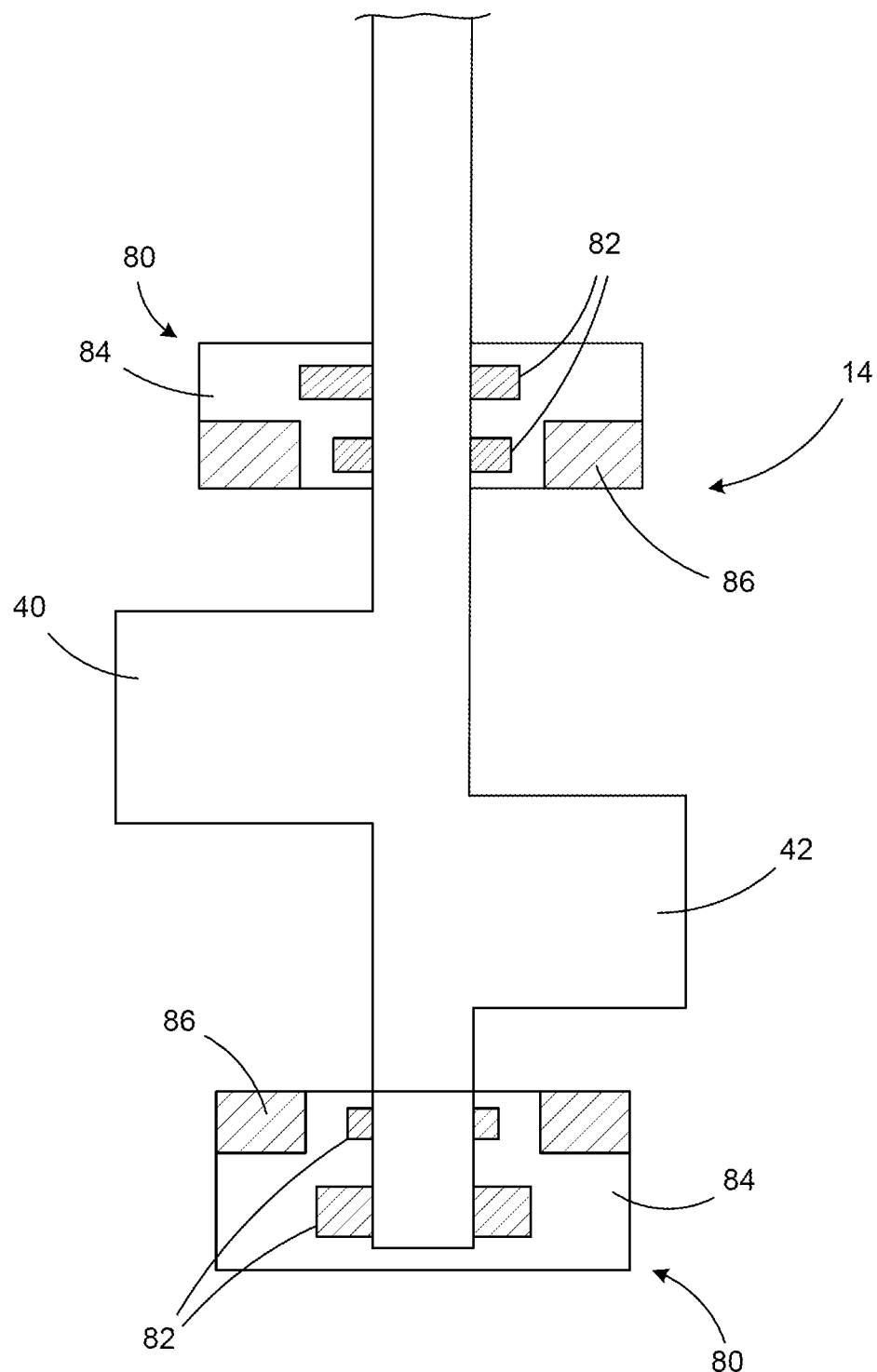
FIG. 5 is a side partially cutaway view of a valve body with bearing assemblies according to one or more embodiments of the present invention.

Turning to FIG. 5, the valve body 14, and more specifically the shaft 20, may be surrounded by two bearing assemblies 80, one at each end within the valve housing 12. Each bearing assembly 80 includes one or more bearings 82, such as ring bearings, seated in a sealed protective housing 84. The sealed protective housings 84 prevent fluid contamination and the consequential reduced operating life and premature failure of the bearings 82. Seals 86, which may be double-lip low friction seals, for example, QUAD-RING® seals, may be used between the bearing assemblies 80 and the valve housing 12.

With the foregoing rotary valve 10, the valve body 14 can continuously rotate in a single direction about its rotational axis avoiding the problems noted above.

Again, such a valve 10 is especially desirable in an automatic, self-powered fluid proportioner. As will be appreciated with such a device, the fluid from the outlet 18 may be mixed with a dosed portion of a second fluid. The movement of the piston 34 may be used to drive the fluid therein as well, or the first fluid may be passed to a second piston that operates in a similar manner to obtain a dosed amount of second fluid. Such a portioner is shown and described in U.S. Pat. No. 6,485,272 and the relevant portions are incorporated herein by reference. However, the use of the rotary valve 10 in a fluid proportioner is again merely preferred and not intended to be limiting.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of my contribution to the art.

The invention claimed is:

1. A rotary valve for use with a fluid proportioner, the rotary valve comprising:
   a valve housing with an inlet and an outlet;
   a valve body rotatably mounted with the valve housing, the valve body having a shaft extending out of the valve housing;
   a piston configured to move linearly within a cylinder; and,
   an arm configured to transfer a linear movement of the piston to a rotational movement of the valve body and rotate the valve body 360 degrees around the shaft within the valve housing.

2. The rotary valve of claim 1, further comprising:
   a cam secured to the valve body and to the arm.

3. The rotary valve of claim 2, wherein the cam comprises at least one detent in a cam surface.

4. The rotary valve of claim 3, further comprising:
   at least one cam follower configured to engage the cam surface.

5. The rotary valve of claim 4, wherein the at least one cam follower is configured to engage the cam surface by rolling along the cam surface.

6. The rotary valve of claim 4, wherein the at least one cam follower is biased towards the cam surface.

7. The rotary valve of claim 4, wherein the cam comprises two detents in the cam surface, wherein the rotary valve includes two cam followers located on opposite sides of the cam.

8. The rotary valve of claim 7, wherein the two cam followers are each biased toward the cam.

9. The rotary valve of claim 7, wherein the two cam followers are configured to provide a force to the cam to change an orientation of the valve body.

10. The rotary valve of claim 7, wherein a position of the two detents in the cam surface correlate to an end of the linear movement of the piston.

11. A rotary valve for use with a fluid proportioner, the rotary valve comprising:
    a valve housing with an inlet and an outlet;
    a valve body rotatably mounted with the valve housing;
    a piston configured to move linearly within a cylinder;
    a cam disposed outside of the valve housing, the cam secured to the valve body so as to provide rotational movement to the valve body; and,
    an arm secured to the piston and to the cam and configured to transfer linear movement of the piston to the rotational movement of the valve body such that the valve body completely rotates within the valve housing.

12. The rotary valve of claim 11, wherein the cam comprises at least one detent in a cam surface.

13. The rotary valve of claim 12, further comprising:
    at least one cam follower configured to engage the cam surface.

14. The rotary valve of claim 13, wherein the at least one cam follower is configured to engage the cam surface by rolling along the cam surface.

15. The rotary valve of claim 13, wherein the at least one cam follower is biased towards the cam surface.

16. The rotary valve of claim 13, wherein the at least one cam follower is configured to provide a force to the cam to change an orientation of the valve body.

17. The rotary valve of claim 13, wherein a position of the at least one detent in the cam surface correlates to an end of the linear movement of the piston.

18. The rotary valve of claim 11, wherein the cam comprises two detents in the cam surface, wherein the rotary valve includes two cam followers located on opposite sides of the cam.

19. The rotary valve of claim 18, wherein the two cam followers are configured to provide a force to the cam to change an orientation of the valve body.

20. The rotary valve of claim 19, wherein a position of the detents in the cam surface correlates to an end of the linear movement of the piston.

* * * * *